(12) United States Patent
Raghavan et al.

(10) Patent No.: US 11,782,231 B2
(45) Date of Patent: Oct. 10, 2023

(54) INSTALLATION OF OPTICAL SENSORS FOR USE IN TRAFFIC MONITORING

(71) Applicants: Palo Alto Research Center Incorporated, Palo Alto, CA (US); Victorian Rail Track, Docklands (AU)

(72) Inventors: Ajay Raghavan, Mountain View, CA (US); Peter Kiesel, Palo Alto, CA (US); Hong Yu, Fremont, CA (US); Kyle Arakaki, Mountain View, CA (US); Qiushu Chen, San Jose, CA (US); Jin Yan, Palo Alto, CA (US); Colin Campbell, Melbourne (AU)

(73) Assignee: Xerox Corporation, Norwalk, CT (US)

( * ) Notice: Subject to any disclaimer, the term of this patent is extended or adjusted under 35 U.S.C. 154(b) by 64 days.

(21) Appl. No.: 17/393,927

(22) Filed: Aug. 4, 2021

(65) Prior Publication Data
US 2023/0038939 A1 Feb. 9, 2023

(51) Int. Cl.
*G01D 5/353* (2006.01)
*G02B 6/50* (2006.01)
*G08G 1/04* (2006.01)

(52) U.S. Cl.
CPC ......... *G02B 6/508* (2013.01); *G01D 5/35316* (2013.01); *G08G 1/04* (2013.01)

(58) Field of Classification Search
CPC .......... G02B 6/46; G02B 6/504; G02B 6/508; E02F 5/10; E02F 5/101; H02G 1/06; H02G 9/06
See application file for complete search history.

(56) References Cited

U.S. PATENT DOCUMENTS

| | | | | |
|---|---|---|---|---|
| 4,554,724 A * | 11/1985 | Bantz | ................. | G05D 1/0265 |
| | | | | 174/505 |
| 6,807,355 B2 * | 10/2004 | Dottier | ................. | G02B 6/4441 |
| | | | | 385/100 |
| 7,095,930 B2 * | 8/2006 | Storaasli | ................. | G02B 6/504 |
| | | | | 385/100 |
| 8,990,032 B2 | 3/2015 | Bajwa et al. | | |
| 9,062,423 B2 * | 6/2015 | Allouche | ................. | G02B 6/504 |
| 9,208,681 B2 | 12/2015 | Borton et al. | | |
| 9,353,887 B2 * | 5/2016 | Konczak | ................. | G02B 6/504 |
| 10,697,804 B2 | 6/2020 | Freeland et al. | | |
| 11,466,428 B1 * | 10/2022 | Pino, Jr. | ................. | E02F 3/8816 |

(Continued)

FOREIGN PATENT DOCUMENTS

CN 111521248 A 8/2020
WO WO 2018/222541 A1 12/2018

OTHER PUBLICATIONS

Fajkus et al., "PDMS-FBG-Based Fiber Optic System for Traffic Monitoring in Urban Areas," Jul. 3, 2020, *IEEE Access*, 8: 127648-127658.

*Primary Examiner* — Benjamin F Fiorello
(74) *Attorney, Agent, or Firm* — Mueting Raasch Group

(57) ABSTRACT

One or more spacers for installing an optical cable are disposed in a trench that extends along an axis. The optical cable includes one or more optical sensors. Each spacer includes a base configured to rest in a bottom of the trench. A first arm extends from the base. The first arm is adjacent to a first wall of the trench. An opposing second arm extends from the base. The second arm is adjacent to an opposing second wall of the trench. The optical cable is configured to extend along the axis.

24 Claims, 14 Drawing Sheets

(56) References Cited

U.S. PATENT DOCUMENTS

| | | | |
|---|---|---|---|
| 2002/0061231 A1* | 5/2002 | Finzel | G02B 6/4463 |
| | | | 405/184 |
| 2002/0140924 A1 | 10/2002 | Wangler et al. | |
| 2003/0127587 A1 | 7/2003 | Udd et al. | |
| 2004/0067004 A1* | 4/2004 | Hill | G08G 1/04 |
| | | | 356/478 |
| 2004/0115004 A1* | 6/2004 | Serrano | H02G 1/06 |
| | | | 405/176 |
| 2004/0165957 A1* | 8/2004 | Serrano | G02B 6/504 |
| | | | 405/184 |
| 2010/0303404 A1 | 12/2010 | Fischer | |
| 2013/0011198 A1* | 1/2013 | Pichler | E02F 5/08 |
| | | | 405/157 |
| 2013/0220708 A1 | 8/2013 | Kim et al. | |
| 2013/0223807 A1* | 8/2013 | Elford | G02B 6/4459 |
| | | | 174/68.3 |
| 2014/0277897 A1* | 9/2014 | Saiz | G05D 1/0236 |
| | | | 701/23 |
| 2019/0137305 A1 | 5/2019 | Karabacak et al. | |
| 2019/0206240 A1 | 7/2019 | Gonçalves | |
| 2019/0317293 A1* | 10/2019 | Cox | G01M 11/37 |
| 2020/0166390 A1* | 5/2020 | Ainger | G01F 1/002 |

\* cited by examiner

INSTALLATION OF OPTICAL SENSORS FOR USE IN TRAFFIC MONITORING

TECHNICAL FIELD

This application relates generally to techniques for traffic monitoring. The application also relates to components, devices, systems, and methods pertaining to such techniques.

BACKGROUND

Fiber optic (FO) sensors can be used for detecting parameters such as strain, temperature, pressure, current, voltage, chemical composition, and vibration. FO sensors are attractive components because they are thin, lightweight, sensitive, robust to harsh environments, and immune to electromagnetic interference (EMI) and electrostatic discharge. FO sensors can be arranged to simultaneously measure multiple parameters distributed in space with high sensitivity in multiplexed configurations over long optical fiber cables. One example of how this can be achieved is through fiber Bragg grating (FBG) sensors. A FBG sensor is formed by a periodic modulation of the refractive index along a finite length (typically a few mm) of the core of an optical fiber. This pattern reflects a wavelength, called the Bragg wavelength, determined by the periodicity of the refractive index profile. The Bragg wavelength is sensitive to external stimulus (strain and/or temperature, etc.) that changes the periodicity of the grating and/or the index of refraction of the fiber. Thus, FBG sensors rely on the detection of small wavelength changes in response to stimuli of interest. In some implementations, FO sensors can be installed on and/or under roads, for example, and operated to detect parameters, e.g., strain, temperature, vibration, related to vehicles traveling on the road.

SUMMARY

Embodiments described herein involve an apparatus, comprising one or more spacers for installing an optical cable in a trench extending along an axis. The optical cable comprises one or more optical sensors. Each spacer comprises a base configured to rest in a bottom of the trench. A first arm extends from the base. The first arm is adjacent to a first wall of the trench. An opposing second arm extends from the base. The second arm is adjacent to an opposing second wall of the trench. The optical cable is configured to extend along the axis.

A system comprises a plurality of spacer groups installed in a plurality of trenches. Each spacer group is configured to support an optical cable in a respective trench that extends along an axis. The optical cable comprises one or more optical sensors. Each spacer comprises a base configured to rest in the bottom of the trench. A first arm extends from the base. The first arm is adjacent to a first wall of the trench. An opposing second arm extends from the base. The second arm is adjacent to an opposing second wall of the trench. The optical cable is configured to extend along the axis.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
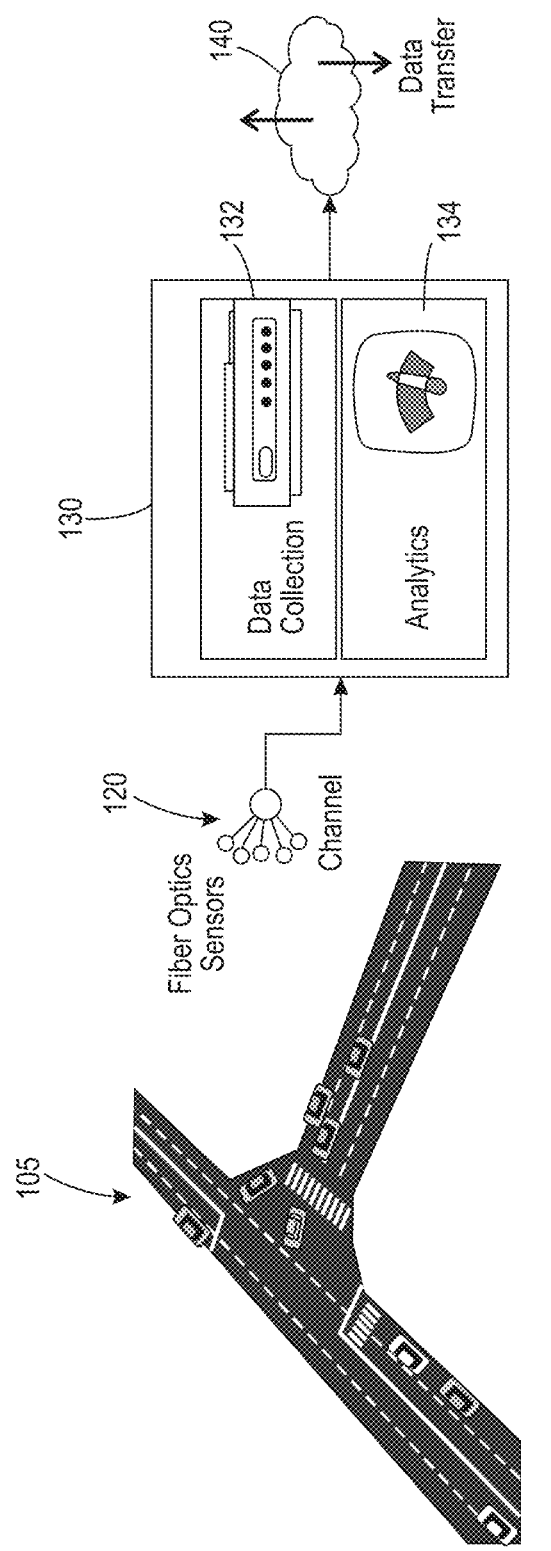
FIG. 1A illustrates a diagram of an FO traffic monitoring system in accordance with embodiments described herein.

Embodiments described herein may involve a traffic monitoring system that is capable of extracting traffic parameters, including characteristics of vehicles and their movement on the road. It is an essential enabler for better traffic management and pavement maintenance/design, which will help to mitigate traffic congestion problems, prevent catastrophic failure due to poor road conditions, and improve the life quality of citizens.

Embodiments described herein may include one or more of 1) capability of monitoring multiple parameters, 2) highly accurate, 3) robust under various field and/or weather conditions, 4) low installation and/or maintenance cost, and low down time. Embodiments herein may involve hardware of a traffic monitoring system based on optical sensors. According to various configurations, the sensors may be fiber Bragg grating (FBG) strain sensors, Fabry Perot sensors, and/or other interferometric optical sensors. In some cases, the sensors may include one or more of electrical and/or resistive sensors, mechanical sensors, and/or other types of strain gages. In some cases, a combination of different types of sensors may be used.

The sensors described herein are generally described as fibers inscribed with FBG arrays as the sensing element for traffic monitoring. FBGs are wavelength-specific narrowband reflectors formed in the core of standard fibers by introducing a periodic variation in the refractive index (RI) of the fiber core. Several factors, including temperature and strain, that change the RI variation will shift the reflection wavelength of an FBG and thus be sensed by the FBG.

While many embodiments described herein use FBGs as an example, it is to be understood that any suitable types of sensors may be used. Detailed considerations for FBG array design for the specific use case are discussed. The proposed fiber optic (FO)-based sensing system has several unique characteristics. For example, the sensing system may be substantially immune to electro-magnetic interference. It allows for less frequent system maintenance and/or calibration, which may be useful for reliable long-term deployment in the field. The proposed system may be independent of visibility condition at the site. The proposed system may be capable of self-calibration of temperature.

The proposed scheme may be capable of monitoring multiple parameters, including one or more of weight-in-motion, speed, axle count, and vehicle class with high accuracy and high dynamic range. The proposed scheme can provide higher spatial resolution of vehicles on the lane, being able to detect a lane-changing event and/or a lane straddling event. According to various embodiments, due to the high spatial resolution, systems described herein may be able to detect imbalanced loads and/or missing and/or flat tires.

Various embodiments show installation strategies to incorporate fibers permanently into the pavement. Though this is invasive installation with introduction of certain amount of material into the pavement, the proposed FBG-based FO sensing system is supposed to facilitate standardized installation procedure, have potential for high level of multiplexing, have a longer lifetime, and be compatible with the mature mass production of FBG FO sensors, which makes this invention more competent and cost-effective for large scale deployment for multi-parameter traffic monitoring.

Embodiments described herein involve fibers with FBG array inscribed are embedded into pavement to sense vehicles moving above. FIG. 1A illustrates a diagram of an FO traffic monitoring system in accordance with embodiments described herein. Vehicles traveling in the sensing region 105 will induce pavement deformation, which will cause strain on the pavement-embedded sensors 120 and produce an FBG wavelength shift signal. Fibers are connected to an FBG interrogator at one end, where the center wavelength of each FBG on the fiber is tracked at a desired frequency. The center wavelengths of FBGs can be streamed to a processor 130 having a data collection module 132 and an analytics module 134 where the information is translated into traffic parameters. The traffic parameters may include one or more of vehicle speed, a traffic volume, a number of axles of at least one vehicle on the road, a vehicle classification of the at least one vehicle on the road, vehicle location in a lane, a vehicle weight, and a weight per axle of the at least one vehicle on the road, for example. The extracted information can then be transfer to the cloud 140, enabling a remote-control center to use the information for traffic and/or road condition management. In some embodiments, the information translation can happen after the raw sensing data are transferred to the cloud.

Typically, there are multiple FBG sensors on one fiber. The center wavelength of each FBG's reflection band distributes in a certain wavelength range. For example, the wavelength range can be from 1510 nm-1590 nm. In one embodiment, the reflection wavelength of each FBG on the same fiber has certain spacing in the spectrum. For example, the spectral spacing of FBGs on the same fiber can be ~2-3 nm. In the wavelength range 1510-1590 nm, a 3 nm spacing will allow ~26 FBGs on one fiber to be interrogated simultaneously. In another embodiment, FBGs on the same fiber can have overlapped reflection bands and signals from different FBGs are distinguished by additional time domain features (e.g., reflection time). In general, the sensing fiber design for this application needs to consider the level of multiplexing needed and trade-off between system performance (sampling rate, wavelength accuracy, etc.) and overall cost (hardware, installation, maintenance, etc.)

Figure 1B:
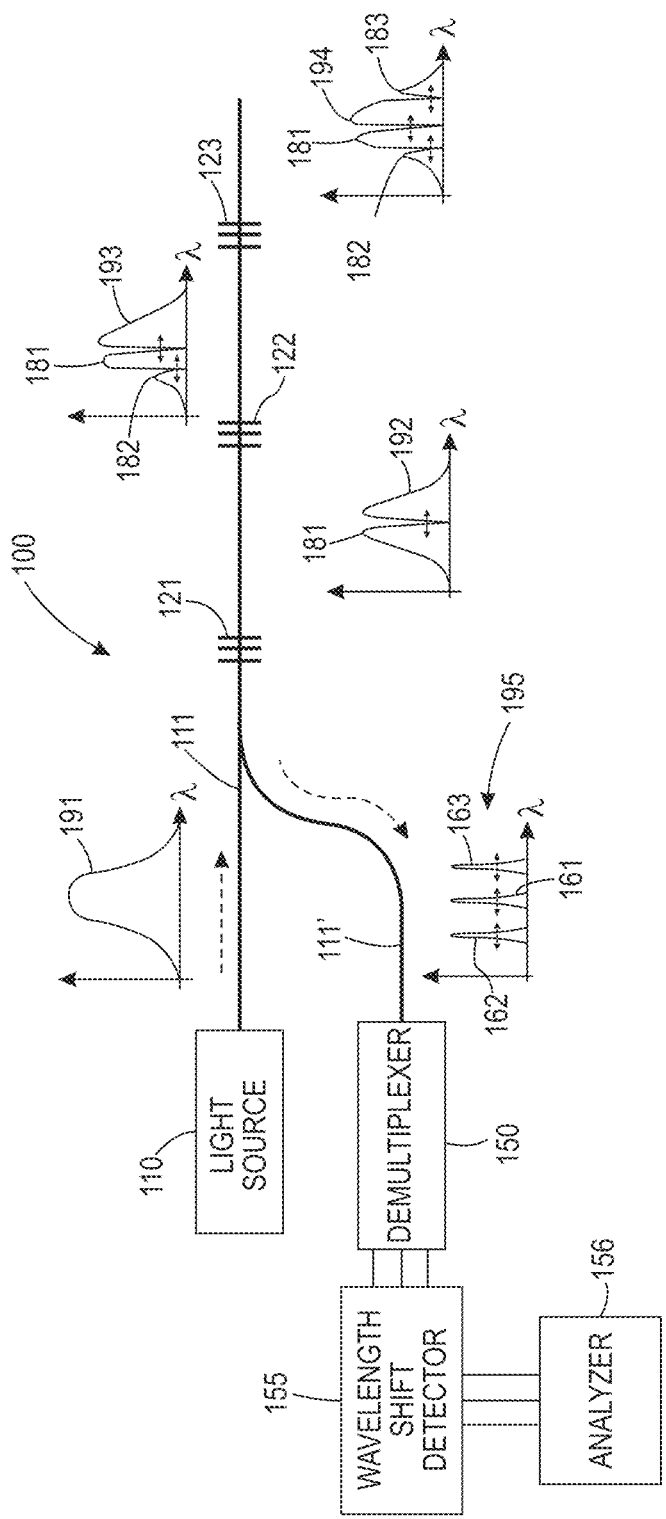
FIG. 1B shows a wavelength multiplexed system can use a compensated sensor array comprising multiple FBG sensors disposed on a single optical fiber in accordance with embodiments described herein.

FO sensors can simultaneously measure multiple parameters distributed in space with high sensitivity in multiplexed configurations over long FO cables. One example of how this can be achieved is through fiber Bragg grating (FBG) sensors. FIG. 1B shows a wavelength multiplexed system 100 can use a compensated sensor array comprising multiple FBG sensors 121, 122, 123 disposed on a single optical fiber 111. The sensors 121-123 may be arranged to sense parameters including one or more of temperature, strain, and/or vibration, for example. As indicated in FIG. 1B, input light is provided by the light source 110, which may comprise or be a light emitting diode (LED) or superluminescent laser diode (SLD), for example. The spectral characteristic (intensity vs. wavelength) of broadband light is shown by inset graph 191. The intensity is highest near the middle of the spectrum and falls off at the spectrum edges. The sensors 121, 122, 123 include compensation, e.g., one or more of different reflectivities and different attenuations, that decreases the difference in the intensity of the output signal light reflected by the sensors to compensate for the input light that is non-uniform in intensity, e.g., due to spectral non-uniformity of the light source and/or scattering losses in the optical fiber. The input light is transmitted via the optical fiber (FO) cable 111 to the first FBG sensor 121. The first FBG sensor 121 reflects a portion of the light in a first wavelength band having a central wavelength, $\lambda 1$. Light having wavelengths other than $\lambda 1$ within the first wavelength band is transmitted through the first FBG sensor 121 to the second FBG sensor 122. The spectral characteristic of the light transmitted to the second FBG sensor 122 is shown in inset graph 192 and exhibits a notch 181 at the first wavelength band centered at $\lambda 1$ indicating that light in this wavelength band is reflected by the first sensor 121.

The second FBG sensor 122 reflects a portion of the light in a second wavelength band having a central wavelength, $\lambda 2$. Light that is not reflected by the second FBG sensor 122 is transmitted through the second FBG sensor 122 to the third FBG sensor 123. The spectral characteristic of the light transmitted to the third FBG sensor 123 is shown in inset graph 193 and includes notches 181, 182 centered at $\lambda 1$ and $\lambda 2$.

The third FBG sensor 123 reflects a portion of the light in a third wavelength band having a central or peak wavelength, $\lambda 3$. Light that is not reflected by the third FBG sensor 123 is transmitted through the third FBG sensor 123. The spectral characteristic of the light transmitted through the third FBG sensor 123 is shown in inset graph 194 and includes notches 181, 182, 183 centered at $\lambda 1$, $\lambda 2$, and $\lambda 3$.

Light in wavelength bands 161, 162, 163, having central wavelengths $\lambda 1$, $\lambda 2$ and $\lambda 3$ (illustrated in inset graph 195) is reflected by the first, second, or third FBG sensors 121, 122, 123, respectively, along the FO cables 111 and 111' to the optical wavelength demultiplexer 150. Compensating input characteristics of sensors 121, 122, 123 cause the difference in the intensity peaks of the light 161, 162, 163 to be reduced when compared to the intensity peaks from an uncompensated sensor array.

From the wavelength demultiplexer 150, the sensor light 161, 162, 163 may be routed to a wavelength shift detector 155 that generates an electrical signal responsive to shifts in the central wavelengths λ1, λ2 and λ3 and/or wavelength bands of the sensor light. The wavelength shift detector 155 receives reflected light from each of the sensors and generates corresponding electrical signals in response to the shifts in the central wavelengths λ1, λ2 and λ3 or wavelength bands of the light reflected by the sensors 121-123. The analyzer 156 may compare the shifts to a characteristic base wavelength (a known wavelength) to determine whether changes in the values of the parameters sensed by the sensors 121-123 have occurred. The analyzer 156 may determine that the values of one or more of the sensed parameters have changed based on the wavelength shift analysis and may calculate a relative or absolute measurement of the change.

In some cases, instead of emitting broadband light, the light source may scan through a wavelength range, emitting light in narrow wavelength bands to which the various sensors disposed on the FO cable are sensitive. The reflected light is sensed during a number of sensing periods that are timed relative to the emission of the narrowband light. For example, consider the scenario where sensors 1, 2, and 3 are disposed on a FO cable. Sensor 1 is sensitive to a wavelength band (WB1), sensor 2 is sensitive to wavelength band WB2, and sensor 3 is sensitive to WB3. The light source may be controlled to emit light having WB1 during time period 1 and sense reflected light during time period 1a that overlaps time period 1. Following time period 1a, the light source may emit light having WB2 during time period 2 and sense reflected light during time period 2a that overlaps time period 2. Following time period 2a, the light source may emit light having WB3 during time period 3 and sense reflected light during time period 3a that overlaps time period 3. Using this version of time domain multiplexing, each of the sensors may be interrogated during discrete time periods. When the intensity of the narrowband light sources varies, a compensated sensor array as discussed herein may be useful to compensate for the intensity variation of the sources.

The FO cable may comprise a single mode (SM) FO cable or may comprise a multi-mode (MM) FO cable. While single mode fiber optic cables offer signals that are easier to interpret, to achieve broader applicability and lower costs of fabrication, multi-mode fibers may be used. MM fibers may be made of plastic rather than silica, which is typically used for SM fibers. Plastic fibers may have smaller turn radii when compared with the turn radii of silica fibers. This can offer the possibility of curved or flexible configurations, for example. Furthermore, MM fibers can work with less expensive light sources (e.g., LEDs) as opposed to SM fibers that may need more precise alignment with superluminescent diodes (SLDs). Therefore, sensing systems based on optical sensors in MM fibers may yield lower cost systems.

Figure 2:
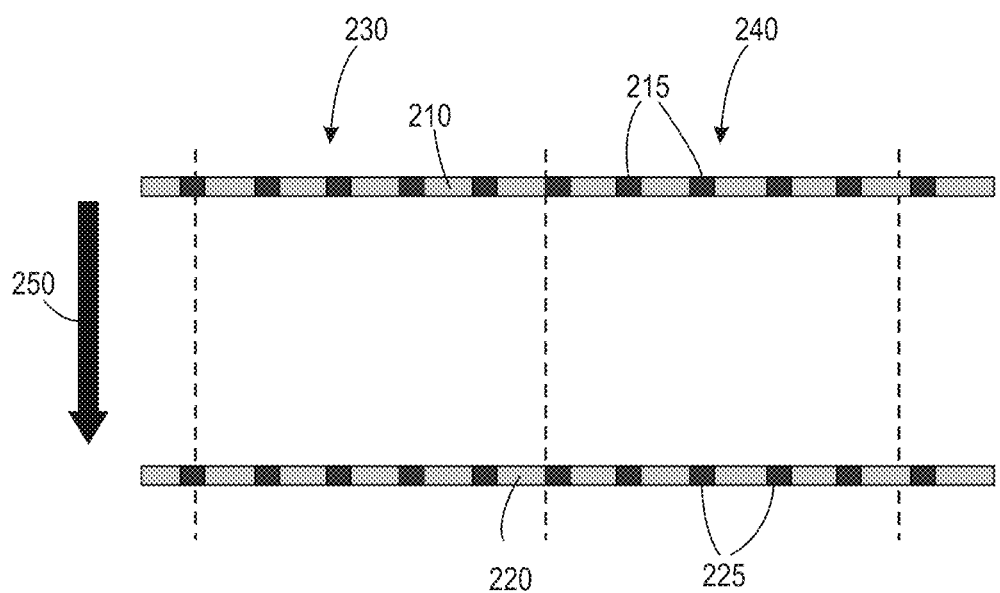
FIG. 2 shows a more detailed view of sensing fiber deployment according to embodiments described herein.

FIG. 2 shows a more detailed view of sensing fiber deployment according to some embodiments. In this example, there are two lanes 230, 240 having a direction indicated by arrow 250. Two optical fibers 210, 220 having a plurality of FO sensors 215, 225 are installed perpendicular to the direction 250 of traffic. For example, the second optical fiber 220 may be installed a predetermined distance from the first optical fiber 210. According to various embodiments, there may be more than two optical fibers and/or the optical fibers may be installed in a configuration other than perpendicular to the direction of traffic. While FIG. 2 shows the optical fiber installed on and/or under two lanes, it is to be understood that the optical fiber may be installed on and/or under any number of lanes.

Figure 3A:
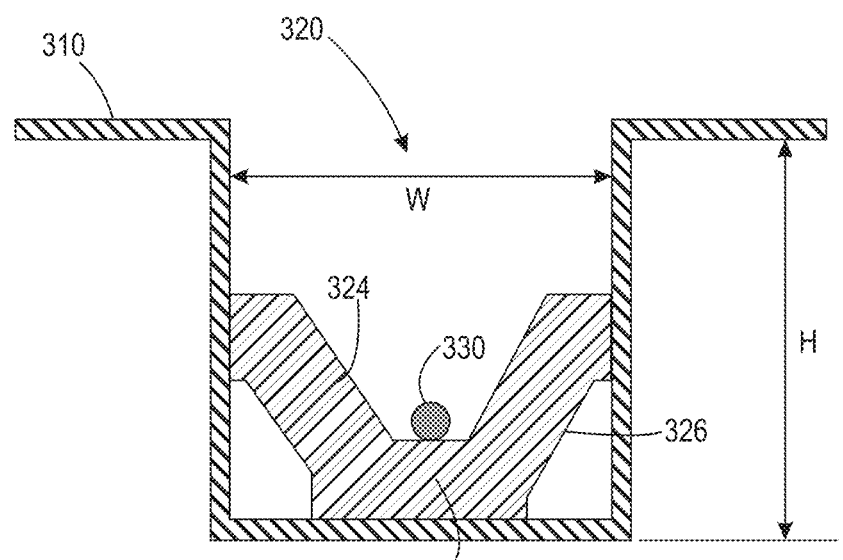
FIGS. 3A and 3B show views of optical fiber installed in a trench using one or more spacers in accordance with embodiments described herein.

According to various embodiments described herein, the optical fibers are installed in two trenches that are a predetermined distance from each other. For example, the distance between the two trenches may be in a range of about 0.5 m to about 5 m. In some cases, the distance between the two tranches is in a range of about 1 m to about 3 m. Each trench 310 can have a cross-sectional dimension (W×H) of about 20 mm×25 mm, as shown in FIGS. 3A and 3B, for example.

According to various embodiments, each fiber 330 can be held at desired height inside the trench 310 by one or more spacers 320. For example, the sensing fiber 330 can be held at a height that is about 5 mm beneath and/or on the road surface. Each of the spacers may comprise a base 322 and two arms 324, 326. At least one of the first arm 324 and the opposing second arm 326 may extend from the base 322 at an angle of greater than 90°, for example. One or both of the first arm 324 and the second arm 326 may be configured to clamp to respective walls of the trench. The clamp mechanism may be configured to be permanent and/or temporary. The first arm 324 and the second arm 326 are shown extending substantially linearly from the base 322. It is to be understood that one or both of the first arm 324 and the second arm 326 may extend from the base nonlinearly.

The base 322 may be configured to rest in the bottom of the trench 310. The spacers 320 are designed to serve as support posts for the optical fiber 330. According to various configurations, the spacers 320 are configured to stay at the location where they are deployed against certain amount of impact during installation. The spacers 320 can be made of one or more of plastic, acrylic, metal, and/or epoxy. According to various embodiments, the spacers 320 can be shaped and/or cured in situ.

Figure 3B:
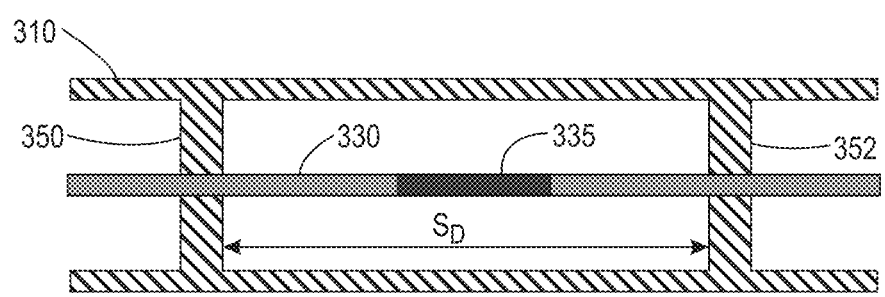

FIG. 3B illustrates a top view of an optical fiber 330 having one or more sensors 335, installed in a trench 310. The optical fiber 330 is supported by one or more spacers 350, 352. The spacers 350, 352 may be installed a predetermined distance, $S_D$, apart to adequately support the optical fiber 330. For example, $S_D$ may be in a range of about 1 cm to about 50 cm. In some cases, $S_D$ may be in a range of about 10 cm to about 35 cm.

Figure 3C:
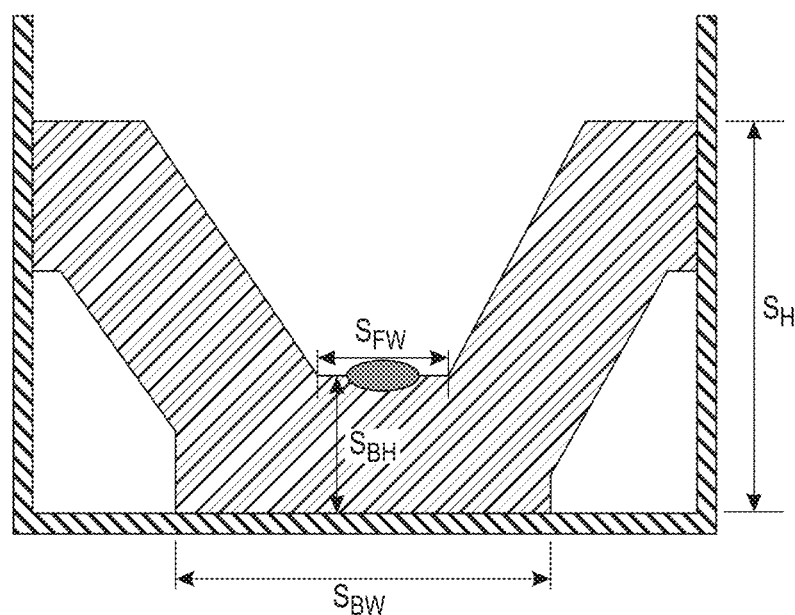
FIG. 3C illustrates a more detailed view of an example spacer in accordance with embodiments described herein.

FIG. 3C shows a more detailed view of an example spacer in accordance with embodiments described herein. The spacer has a height, $S_H$, in a range of about 5 mm to about 20 mm. The spacer may be configured to hold the optical fiber a predetermined distance, $S_{BH}$, from the bottom of the trench. For example, SBH may be in a range of about 2 mm to about 20 mm. The spacer has a bottom width, $S_{BW}$, in a range of about 5 mm to about 15 mm. The spacer may have a width on the fiber facing surface, $S_{FW}$, in a range of about 2 mm to about 10 mm.

Figure 4A:
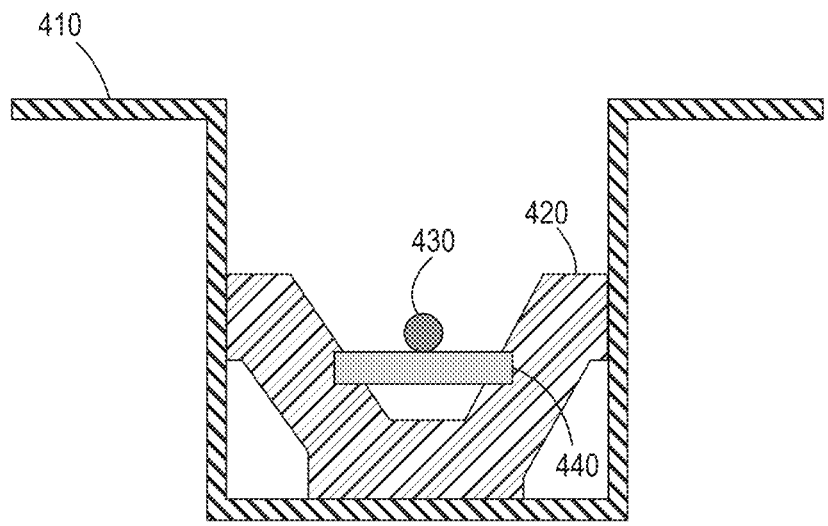
FIGS. 4A and 4B show views of optical fiber installed in a trench using one or more spacers and a support material in accordance with embodiments described herein.
Figure 4B:
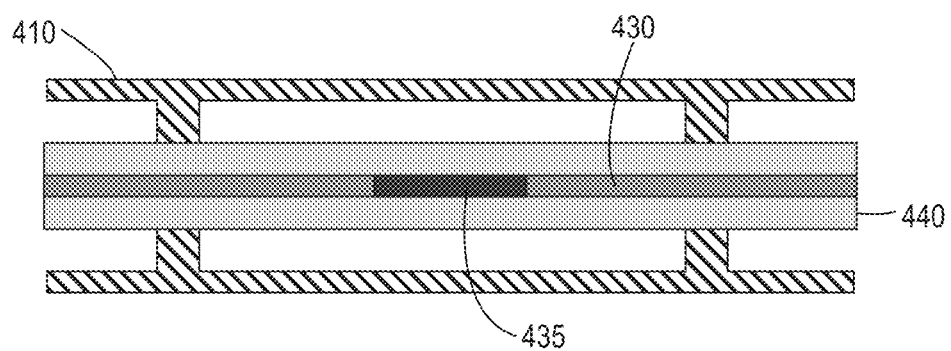

Some support materials, e.g. metal bars, can be used together with one or more spacers to further stabilize the fibers inside the trench as shown in FIGS. 4A and 4B. One or more of the dimensions, materials, and or the structure of the support material 440 is chosen so that: 1) it will not significantly deflect due to its self-weight when held in the trench 410 by spacers 420, the total mass is optimized thus not being a potential hazard to the pavement, and 3) it is compatible with the filling resin (matched thermal expansion coefficient, etc.). In some cases, the filling material may comprise an epoxy. The use of additional support materials is supposed to improve the mechanical robustness of the system during and/or after the installation and make the installation more controllable. For example, a piece of rigid bar (e.g., metal and/or composite bar) can be first positioned inside the trench 410, held in place by spacers 420. Then, optical fibers 430 bearing FBGs 435 may be attached to the surface of the spacer 440, with desired pre-strain applied to the sensing point. The support material 440 may be configured to prevent fibers being distorted by the later resin filing step, when the trench is filled at least partially with epoxy. In some embodiments, the sensing fiber 430 can be pre-mounted onto a support bar 440 with desired pre-strain applied to the sensing points 435 outside the trench 410. Then, the functionalized support bar may be positioned inside the trench 410, held in place by spacers 420.

The capability of controlling the amount of pre-strain applied to the sensors and preventing fibers being disturbed by resin may be useful for multiplexing applications, where FBGs on one sensing fiber can be densely populated in a certain spectral range with small spectral distance in-between. Undesired stretching or compressing of the sensing fiber during the installation may significantly change the spectral location of affected FBG sensors and thus may disturb the spectral spacing between sensing points. According to various embodiments, if two sensing points overlap in the spectrum, the performance of the sensing system may significantly deteriorate. The introduction of the support material, e.g. metal bars, thus makes the proposed system less subjective to handling. error, improve the success rate of deployment and/or improve the overall system reliability.

According to various embodiments, the height of the sensing fiber inside the trench has an impact on the signal strength/features of signal picked up by the FBG sensors. The closer the fiber is to the surface of the road, the stronger the wavelength shift of a FBG may be when a vehicle passes. When the fiber is close to the surface, however, the signal pattern may be more complicated, as there are multiple factors that may contribute to the deformation of the shallow layer of pavement, including the friction between the tire and the road, and the weight and/or load of the vehicle.

In one embodiment, the sensing fiber can be mounted close to the bottom of the first asphalt layer (for example, about 20 mm to about 30 mm from the road surface). In this configuration, replacing the first pavement layer is not necessarily destroying the sensing system. At this height, the FBGs sensors can provide a cleaner signal for vehicle feature extraction, since they are less affected by the friction force and more specific to the vertical strain, which is better correlated with the vehicle weight.

After the fibers are positioned in place, a resin can be used to seal the trench and connect the sensing elements to the pavement to enable traffic monitoring. Polyurethan-based PU200, acrylic-based AS475, P5G, and epoxy-based G100 are a few examples of filling material.

In some cases, fibers with reinforced coating are used as the sensing element. The coating may be configured to strengthen the optical cable mechanically. In some cases, the coating is configured to protect the optical cable from chemicals and/or moisture. For example, Polyetheretherketone (PEEK™) coating and/or Glass Fiber Reinforced Polymer (GFRP) coating can be used. With the coated fiber, the system could maintain its mechanical robustness while the installation step can be further simplified (no additional supported material is needed for example, fibers can be directed attached to spacers while maintaining certain pre-strain), reducing the on-site installation time significantly. This may be beneficial for system deployment and can make this technology more acceptable in applications (less time required for traffic control and reduced labor cost).

According to various embodiments, local temperature can affect the strain transfer between the tire and the pavement and between the pavement and the sensing element. FBGs can sense both temperature and vehicle-induced strain, separating these two factors by looking at the signal in different time scale (e.g., temperature: <1 Hz, vehicle-related strain >1 Hz). Thus the FBG-based system is capable of performing self-calibration with respect to temperature factor.

Figure 5A:
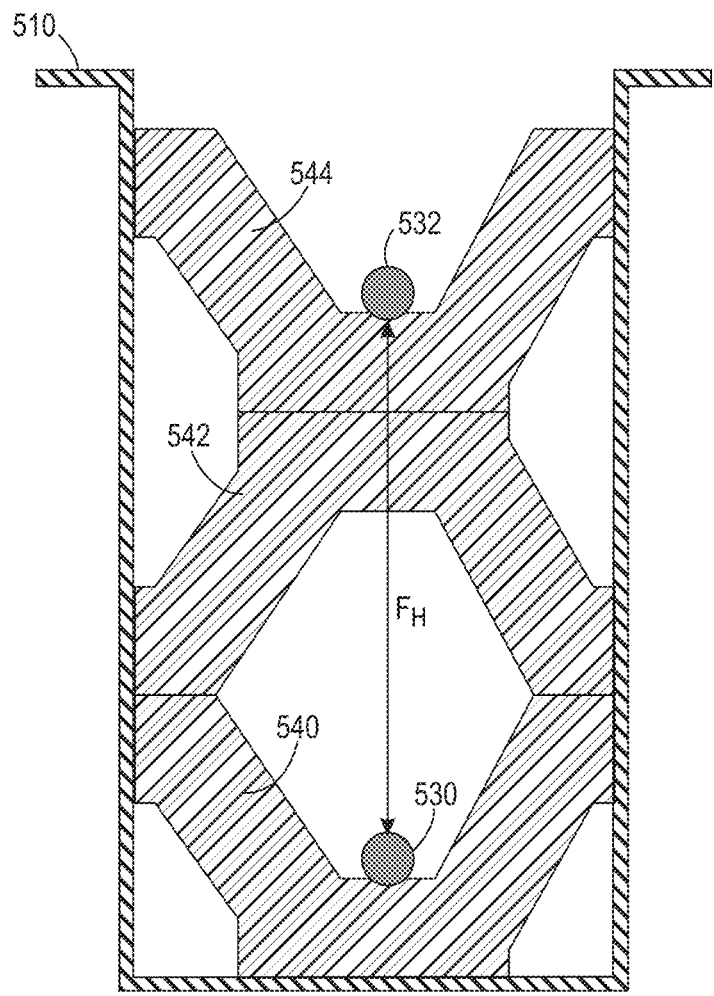
FIGS. 5A and 5B illustrate stackable spacers configured to support two optical fibers at different heights within the trench in accordance with embodiments described herein.
Figure 5B:
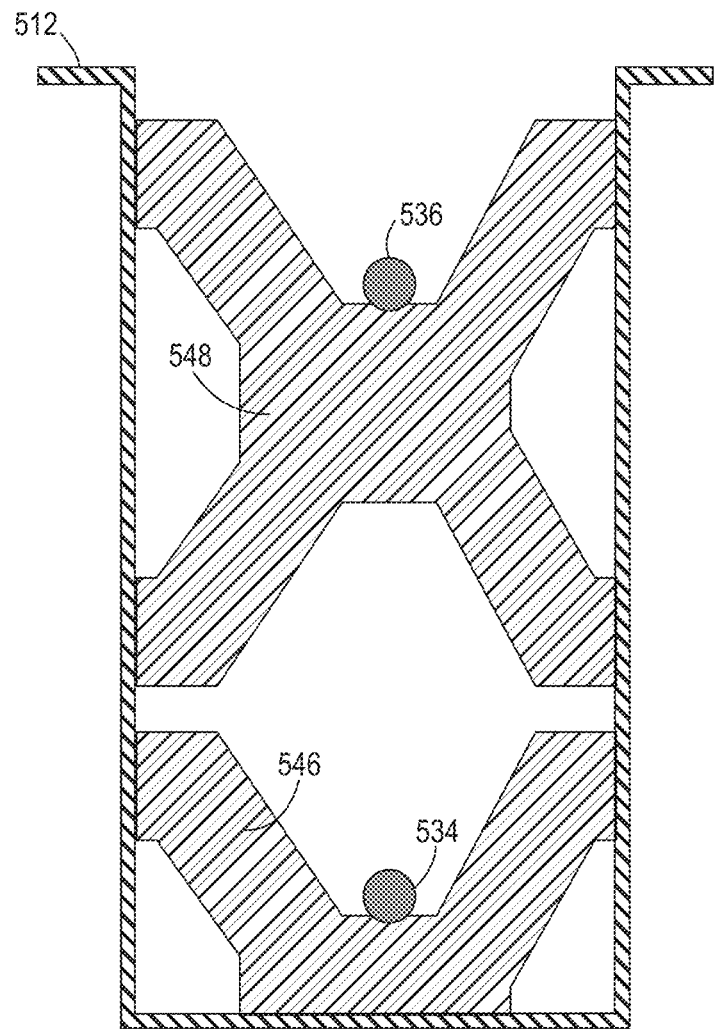

According to various configurations, two or more fibers may be installed at different heights inside the trench as shown in FIGS. 5A and 5B. In this example, one or more first stackable spacers 540 are configured to contact the bottom of the trench 510 in accordance with embodiments described herein. The first stackable spacer 540 is configured to support a first optical fiber 530. One or more second stackable spacers 542 are disposed such that the base of the second stackable spacer 542 is opposite that of the base of the first stackable spacer 540. A base of a third stackable spacer 544 is configured to substantially contact the base of the second stackable spacer 542. The third stackable spacer 544 is configured to support a second optical fiber 532. The second 542 and third 544 stackable spacers may be configured to hold the second optical fiber 532 a predetermined distance, $F_H$, from the first optical fiber 530. For example, $F_H$ may be in a range of about 10 mm to about 20 mm.

According to various embodiments, the two fibers 530, 532 can be used to target different sensing parameters. Fibers 532 located near the pavement surface may be more sensitive, producing a larger response when a vehicle passes. These sensors 532 may be good for event detection and axle count, improving the system detection accuracy for small and/or light vehicles. Fibers 530 that are deeper inside the trench may be less affected by friction force and provide cleaner signal for vehicle weight analysis.

According to various embodiments, the second and third stackable spacers are integrated into one stackable spacer as shown in FIG. 5B. In this example, one or more first stackable spacers 546 are configured to contact the bottom of the trench 512. The first stackable spacer 546 is configured to support a first optical fiber 534. One or more second stackable spacers 548 are disposed such that the base of the second stackable spacer 548 is opposite that of the base of the first stackable spacer 546. The second stackable 548 spacer is configured to support a second optical fiber 536. While FIGS. 5A and 5B illustrate examples in which two optical fibers are installed at different heights within a trench, it is to be understood that any number of optical fibers may be installed at different heights within the trench. More spacers may be used to accommodate additional optical fibers, for example.

Figure 6:
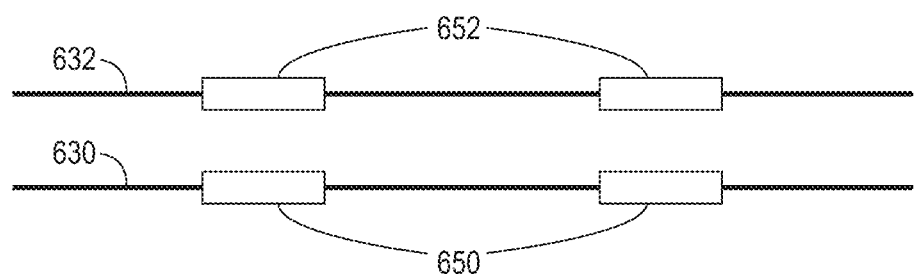
FIG. 6 shows alignment of two or more fibers that are installed at different heights inside the trench in accordance with embodiments described herein.

In some embodiments, the sensing points 650, 652 on the two fibers 630, 632 have substantially identical locations along the respective fiber and each sensing point is substantially aligned with respect to its counterpart on the other fiber during the installation as shown in FIG. 6. In that case, if a vehicle is traveling perpendicular to the fiber pair, it may activate the same set of sensors on the two fibers with similar manner. Given the complex nature of the interaction between the tire and the pavement, this arrangement may provide self-reference and/or calibration capability to the sensing system and may be helpful to obtain a high accuracy performance in practical situations. In some cases, the sensing points 650, 652 are not aligned with each other. The alignment of sensing points shown in FIG. 6 may be applicable to two fibers installed in different trenches for a single lane.

Figure 7A:
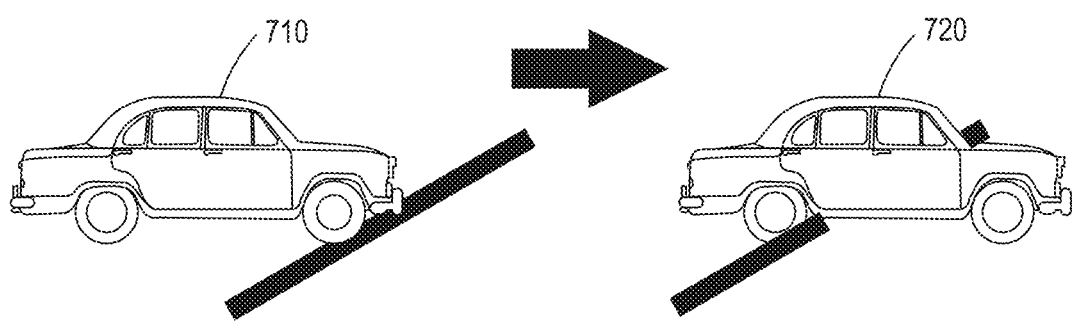
FIGS. 7A and 7B show an output signal showing temporal features that can be used to determine various aspects of vehicles as they travel on the road above the optical fibers in accordance with embodiments described herein.
Figure 7B:
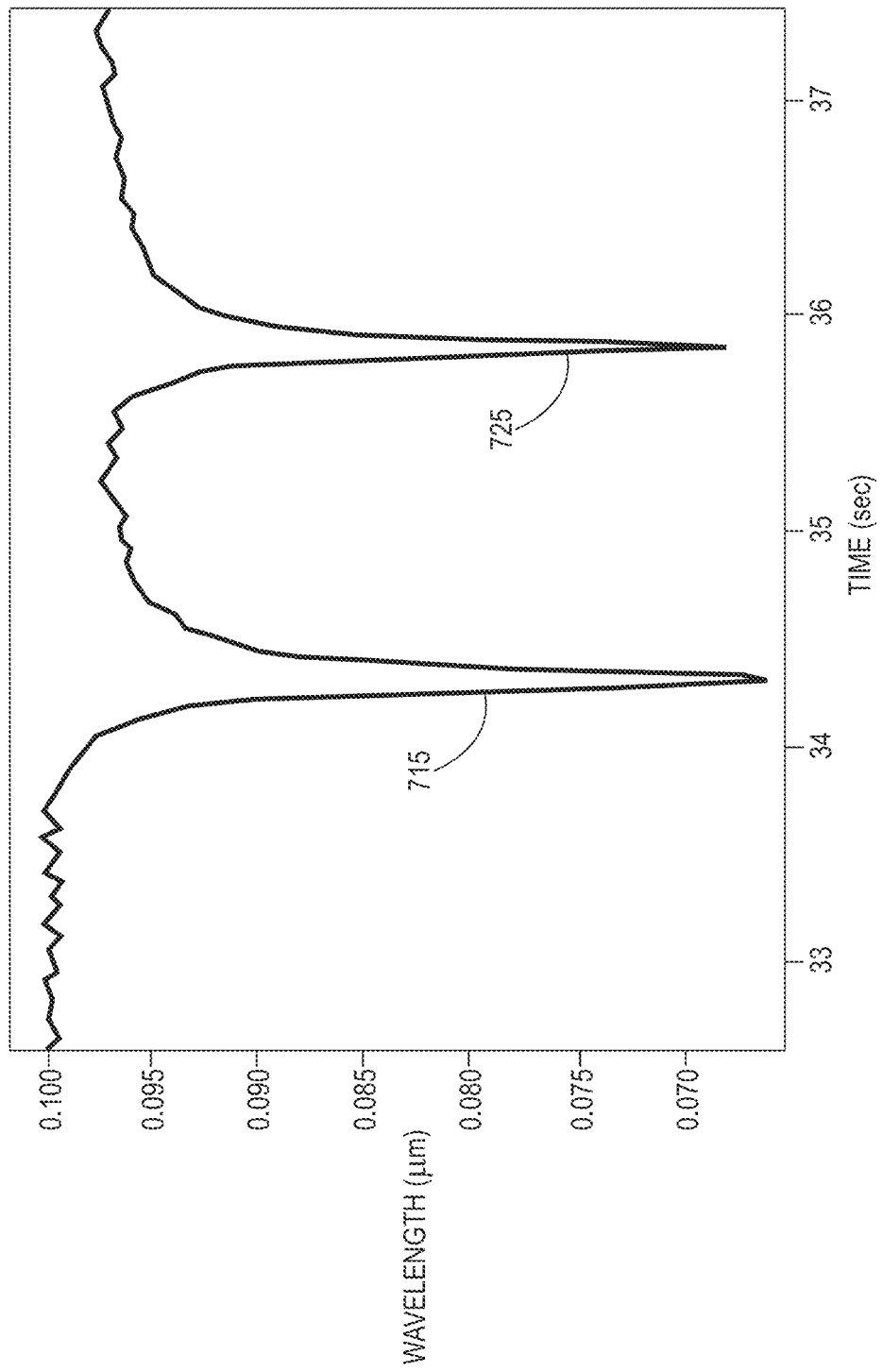

As a vehicle travels on a road above the optical fibers, temporal features may be collected. For example, FIGS. 7A and 7B show an example in which a first axle 710 of a vehicle traverses the optical fiber creating a first signal peak

715. As a second axle 720 of the vehicle traverses the optical fiber, a second signal peak 725 at a later time is created.

Figure 8A:
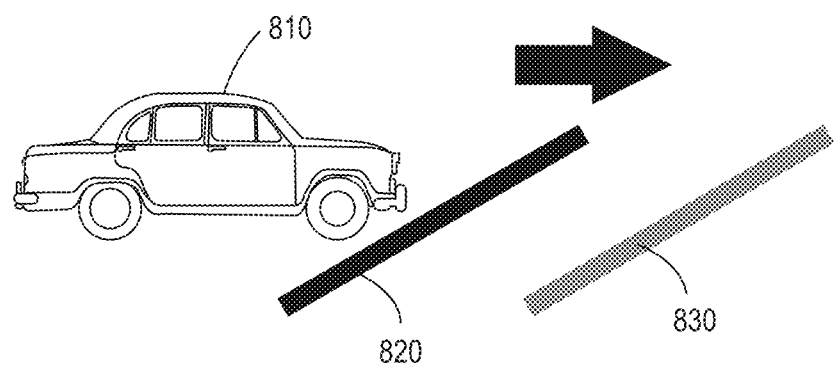
FIGS. 8A and 8B show vehicle speed determination based on the output signal in accordance with embodiments described herein.
Figure 8B:
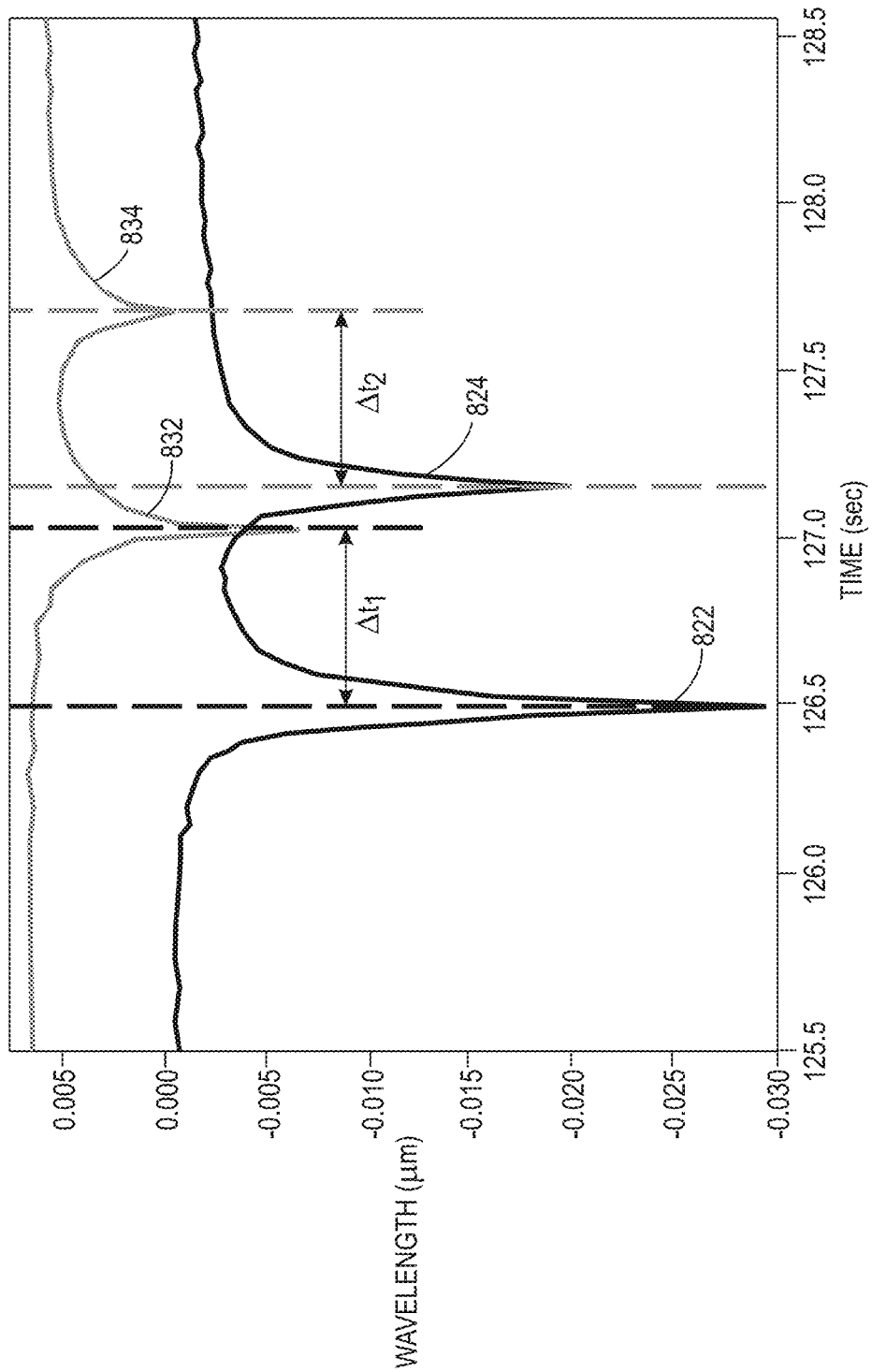

Vehicle speed may be determined by the temporal feature of the signal. For example, time delay between signals in the two fibers 820, 830 corresponding to the same axle and/or other identifiable feature of the vehicle 810 can be utilized as shown in the example of FIGS. 8A and 8B. The spacing AL between the two sensing fibers 820, 830 and the sampling rate of the detection system determine the speed detection resolution of the system in this case. For example, in FIG. 8B, vehicle speed can be determined as $$\frac{1}{2}\left(\frac{\Delta L}{\Delta t_1}+\frac{\Delta L}{\Delta t_2}\right),$$

which is the average speed of the first and the second axle of the vehicle when it passes the detection area. Other temporal features that might be utilized include the width of a feature peak in one fiber, for example.

Vehicle axle count and classification is determined by the features (number of peaks, for example) extracted from the dynamic response of sensors during an event. The physical spacing between sensing points (transverse spatial resolution of the sensing system), the system sampling rate, the depth of the sensing element inside the pavement will all have an impact on the event features and thus the accuracy of axle count and classification.

Figure 9A:
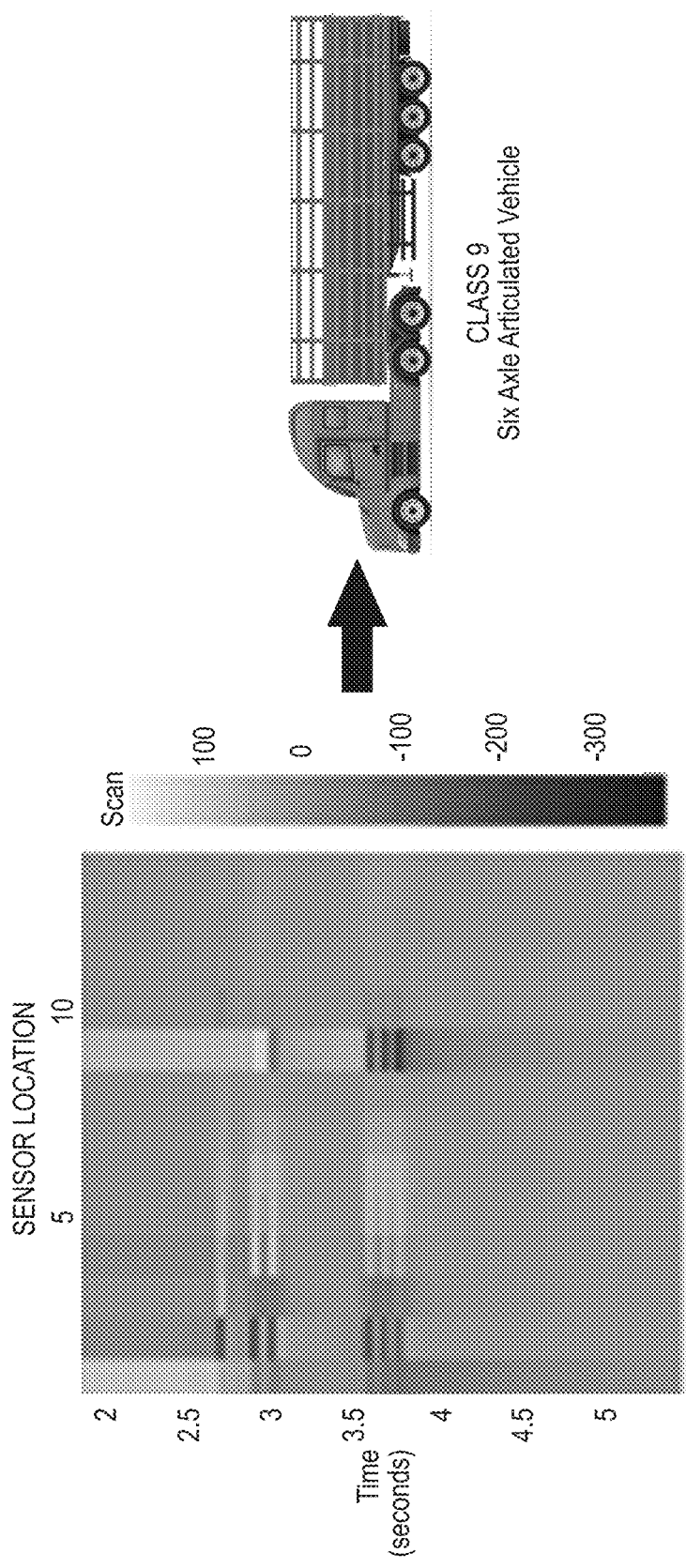
FIGS. 9A and 9B illustrate vehicle classification based on spatial and temporal features in the sensing signal in accordance with embodiments described herein.
Figure 9B:
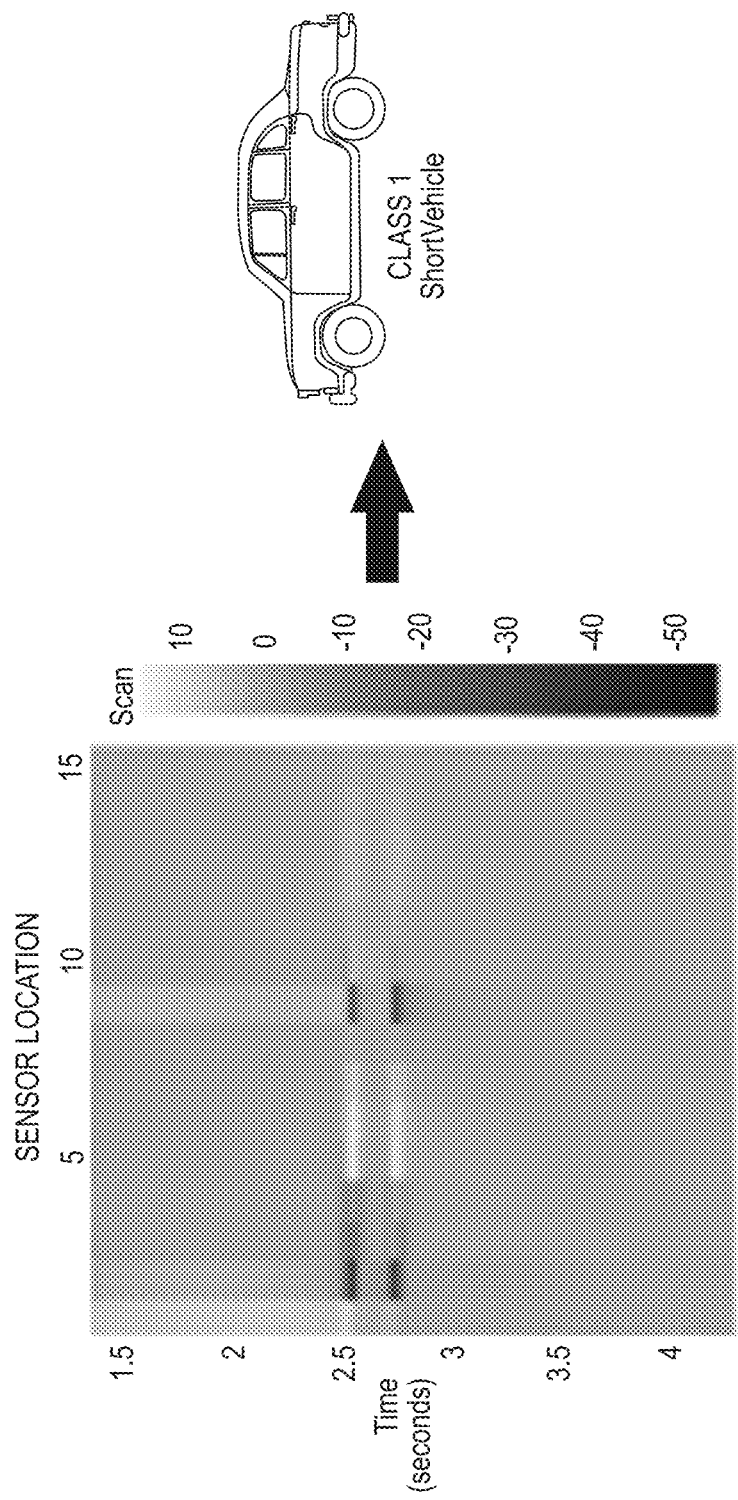

Vehicle weight may be derived from the signal strength of the FBG wavelength shift. The high spatial resolution of FBG arrays provides details about the tire-pavement interaction. The actual depth of sensing element, the local stiffness of the pavement, temperature will affect the amplitude of wavelength shift for a given weight, thus calibration of local response may be used to achieve accurate weight-in-motion using the system. FIGS. 9A and 9B illustrate vehicle classification based on spatial and temporal features in the sensing signal.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art.

The foregoing description of the example embodiments have been presented for the purposes of illustration and description. It is not intended to be exhaustive or to limit the inventive concepts to the precise form disclosed. Many modifications and variations are possible in light of the above teachings. Any or all features of the disclosed embodiments can be applied individually or in any combination, not meant to be limiting but purely illustrative. It is intended that the scope be limited by the claims appended herein and not with the detailed description.

What is claimed is:

1. An apparatus, comprising:
two or more spaced-apart spacers for installing an optical cable in a trench extending along an axis, the optical cable comprising one or more optical sensors, each spacer comprising:
 a base configured to rest in a bottom of the trench;
 a first arm extending from the base, the first arm adjacent to a first wall of the trench;
 an opposing second arm extending from the base, the second arm adjacent to an opposing second wall of the trench, the optical cable configured to extend along the axis, wherein the optical sensors are located away from the two or more spacers such that light input to the one or more optical sensors experiences a wavelength shift due to traffic moving over the optical cable; and
 a support material configured to extend between the first arm and the second arm along the axis.

2. The apparatus of claim 1, wherein the one or more optical sensors comprise fiber Bragg grating (FBG) sensors, wherein a deflection of pavement due to the traffic causes a strain in the FBG sensors, the strain producing the wavelength shift.

3. The apparatus of claim 2, wherein the FBG sensors comprise two or more FBG sensors having reflection wavelengths spaced apart in a spectrum allowing the two or more FBG sensors to be interrogated simultaneously.

4. The apparatus of claim 1, wherein at least one of the first arm and the opposing second arm extend from the base at an angle of greater than 90°.

5. The apparatus of claim 1, wherein the optical cable is configured to be in substantial contact with the base, and wherein base is configured to hold the optical cable a predetermined distance from a bottom of the trench.

6. The apparatus of claim 1, wherein the optical cable is configured to be in substantial contact with the support material.

7. The apparatus of claim 1, wherein the support material is a rigid bar.

8. The apparatus of claim 1, wherein the optical cable has a coating that strengthens the optical cable mechanically and protects the optical cable from one or both of chemicals and moisture.

9. The apparatus of claim 1, wherein the trench is disposed one or more of on and under a road.

10. The apparatus of claim 9, wherein the one or more optical sensors are configured to measure at least one parameter of traffic on the road in response to the wavelength shift.

11. The apparatus of claim 10, wherein the at least one parameter comprises one or more of a vehicle speed, a traffic volume, a number of axles of at least one vehicle on the road, a vehicle classification of the at least one vehicle on the road, and a weight per axle of the at least one vehicle on the road.

12. The apparatus of claim 1, further comprising a resin configured to seal the trench and connect the one or more sensors to pavement of a road.

13. The apparatus of claim 1, wherein the first and second arms are configured to clamp to the respective walls of the trench.

14. An apparatus, comprising:
one or more spacers for installing an optical cable in a trench extending along an axis, the optical cable comprising one or more optical sensors, each spacer comprising:
  a base configured to rest in a bottom of the trench;
  a first arm extending from the base, the first arm adjacent to a first wall of the trench; and
  an opposing second arm extending from the base, the second arm adjacent to an opposing second wall of the trench, the optical cable configured to extend along the axis, wherein each spacer of the one or more spacers is a first stackable spacer and further comprising a second stackable spacer disposed such that the base of the second stackable spacer is opposite that of the base of the first stackable spacer.

15. The apparatus of claim 14, further comprising a third stackable spacer, the base of the third stackable spacer configured to substantially contact the base of the second stackable spacer, wherein a second optical cable is configured to extend along the trench on the base of the third stackable spacer.

16. The apparatus of claim 15, wherein the second stackable spacer and the third stackable spacer are combined to create one continuous spacer.

17. A system, comprising:
a plurality of spacer groups installed in a plurality of trenches, each spacer group comprising spaced-apart spacers configured to support an optical cable in a respective trench that extends along an axis, the optical cable comprising one or more optical sensors, each spacer within each spacer group comprising:
  a base configured to rest in a bottom of the trench;
  a first arm extending from the base, the first arm adjacent to a first wall of the trench;
  an opposing second arm extending from the base, the second arm adjacent to an opposing second wall of the trench, the optical cable configured to extend along the axis, wherein the optical sensors are located away from the two or more spacers such that light input to the one or more optical sensors experiences a wavelength shift due to traffic moving over the optical cable; and
  a support material configured to extend between the first arm and the second arm along the axis.

18. The system of claim 17, wherein the one or more optical sensors comprise fiber Bragg grating (FBG) sensors, wherein a deflection of pavement due to the traffic causes a strain in the FBG sensors, the strain producing the wavelength shift.

19. The system of claim 18, wherein the FBG sensors comprises two or more FBG sensors having reflection wavelengths spaced apart in a spectrum allowing the two or more FBG sensors to be interrogated simultaneously.

20. The system of claim 17, wherein the plurality of trenches are disposed under a road.

21. The system of claim 20, wherein the one or more optical sensors are configured to measure at least one parameter of traffic on the road in response to the wavelength shift.

22. The system of claim 21, wherein the at least one parameter comprises one or more of a vehicle speed, a traffic volume, a number of axles of at least one vehicle on the road, a vehicle classification of the at least one vehicle on the road, and a weight per axle of the at least one vehicle on the road.

23. The system of claim 17, wherein each of the plurality of trenches are disposed at a predetermined distance from at least one adjacent trench of the plurality of trenches.

24. The system of claim 23, wherein the predetermined distance is in a range of about 1 m to about 3 m.

* * * * *